3,280,142
MANUFACTURE OF PHTHALOCYANINES
Arthur P. Hopmeier, Upper Saddle River, and Eric N. Blackstead, Montclair, N.J., assignors to Sun Chemical Corporation, New York, N.Y., a corporation of Delaware
No Drawing. Filed July 10, 1963, Ser. No. 294,196
7 Claims. (Cl. 260—314.5)

The present invention relates to phthalocyanine pigments and particularly to a process for producing phthalocyanine pigments and more particularly to a process for producing copper phthalocyanine pigments.

At present, there are two well-known processes for the preparation of copper phthalocyanines. In one process known as the "phthalonitrile process," o-phthalonitrile is reacted with a copper salt at temperatures in the range of 180° C. to 250° C. and then purified by acid leaching. In the other process, known as the "urea process," a mixture of phthalic anhydride, urea, a metal compound such as a copper salt and a suitable catalyst are heated at temperatures in the order of 200° C.

In the phthalonitrile process, when a mixture of phthalonitrile and a metal salt, such as cupric chloride, is heated, a vigorous exothermic reaction takes place and the temperature, unless carefully controlled, may frequently rise above the point of most efficient reaction. Some decomposition takes place at these high temperatures, resulting in low yields and causing the product to be unattractive in color in comparison to products made under carefully controlled processes. One method of controlling the reaction in the phthalonitrile process is to employ a suitable diluent liquid; but the same problems of storing and handling the liquid, the making up of the inevitable losses, and the extensive problems of removal of the liquid and recovery for reuse have added materially to the cost of such processes. Consequently, it is highly desirable to develop a means of carrying out this reaction in the absence of a liquid diluent.

Turning to the urea process, wherein phthalic anhydride, a copper salt catalyst and urea are thoroughly mixed and heated together, the reaction mass fuses, giving off volatile by-products and going through a very frothy plastic stage before it finally sets up to a porous salt which has a tendency to adhere to the surface of the equipment in which the reaction takes place. As a chemical process, this reaction is very attractive and many attempts have been made to operate on a commercial scale. However, when the process is operated on a large scale, a number of difficulties appear. For instance, there is a tendency for some separation of ingredients in the absence of agitation which results in markedly reduced yields. Furthermore, the tendency to foam during the heating cycle results in a porous mass with poor heat transfer so that the interior of the mass is at a different temperature from the periphery which is close to the heat source, resulting in low yields and poor quality. Even agitation of the reaction mass does not solve this problem because it eventually becomes impossible to agitate the mixture when it sets up in a solid state, thereby resulting in a non-uniform reaction mass, which sticks to the vessel and the agitator, thus posing problems in the discharge of the reaction vessel.

Due to these serious difficulties in the operation of this process, the industry has turned to an alternative process wherein a suitable liquid diluent is added to the mixture. By employing a liquid diluent, it is then possible to gain effective heat transfer and excellent agitation with the resulting final product being suspended in the liquid diluent. The product and diluent may be separated by any conventional means such as filtration, distillation, centrifugation, or the like. This process which has been used widely in the industry, has given good yields and excellent products; however, the necessity for recovering the large amounts of organic liquid adds significantly to the cost of phthalocyanine.

Still other processes such as exemplified in U.S. Patents Numbers 2,197,458, 2,197,459 and 2,214,477 have been proposed, using urea with which certain dehydration and deamidation products of diammonium phthalate, for instance, phthalic anhydride, phthalimide, phthaldiamide and the like, and a metal reagent are suitably reacted. These proposed processes possess high merit but they have a disadvantage that the processes are accompanied by undesirable foaming and frothing of the reaction melt. Due to the nature and volume of these foams, the reaction mass cannot be kept at the necessary temperature for complete reaction. Consequently, processes making use of the "urea method," of synthesis commonly yield a relatively low amount of the desired dyestuff; processing equipment is unduly large with respect to the actual quantity of material processed; and a certain amount of danger to the operating personnel is always present. Still another process, as exemplified by U.S. Patent Number 2,964,532, describes a process for preparing phthalocyanines which comprises passing a thin layer of pre-mixed phthalic anhydride, urea, a metal or a non-organic metal salt and a catalyst at reaction temperature between and in contact with the inner surface of a cylinder and the surface of a screw rotating within said cylinder. The thickness of the layer of reactants may range from about ¼" to ½" which is controlled by the size of the shaft on the screw rotating within the cylinder. The maintenance of this thin layer is essential for proper heat transfer and agitation, as the reaction mass passes through a melt stage and back to a solid state as the reaction goes to completion. This process like the others possesses high merit, but it has several disadvantages, for instance, the process requires that the reactants be pre-mixed before they are added to the reactor; there is a restriction of from 0.25 to 0.50 inch on the layer thickness of the reactants and the product is discharged as small solid pieces which require further particle reduction. Therefore, a method of preparing phthalocyanine pigments which employs a simple fusion process, which could be operated economically, would be a practical improvement.

It is an object of this invention to provide a novel process for carrying out fusion reactions in the production of phthalocyanines. Another object of this invention is to provide a novel process for the manufacture of copper phthalocyanines by a fusion reaction between phthalic anhydride, urea and copper salts in the presence of a suitable catalyst. Still another object of this invention is to obtain a phthalocyanine product, substantially free of all by-product gases, such as carbon dioxide and ammonia. Still another object of this invention is to manufacture phthalocyanines without the necessary premixing of the reactants. Still another object of this invention is to maintain uniform mixing of the reactants throughout the reaction cycle without employing a solvent.

The objects of this invention are achieved by a process for producing a phthalocyanine which comprises separately adding each of the reactants to a reactor and heating the reactants to a reaction temperature of from about 150° C. to about 300° C. with agitation. When the reaction is completed the reaction product is recovered from the mill as a fine powdery material. The reactants which may be employed in this reaction comprise phthalic anhydride or its derivatives, urea or its derivatives such as biuret or the like and a metal or a non-organic metal salt which furnishes the metal for the metal-containing phthalocyanine. A molybdenum catalyst such as ammonium molybdate is usually employed as part of the phthalocyanine forming reactants. Included in the derivatives of phthalic anhydride which may be used in this invention are the corresponding free acid, or a mono-ether, e.g. alkyl ether thereof, or an ammonium salt thereof or a mono or di-amide or imide of the acid or an ortho-cyano-benzoic acid or an ammonium salt or ester thereof. As substituted phthalic compounds there are the mono-di- and tri-halo phthalic acids and their derivatives, the nitro-phthalic acids and their derivatives, the benzene-tri- and tetra-carboxylic acids, e.g. hemimellitic, trimellitic and pyromellitic acids. In connection with these it is to be noted that the process of the invention permits the production of phthalocyanines from compounds not readily transformed into intermediate compounds suitable for use in the earlier processes. Likewise, mixtures of the various phthalic derivatives may also be used if necessary to give particular shades of color.

In addition to urea, other nitrogen containing compounds may be employed in this invention, such as formamide, di-cyandiamide, ammonium carbonate, ammonium carbamate, guanylurea guanidine, thiourea, carbonyl urea, monosodium urea, methylol urea, ammelin, ammelide, cyanuric acid and cyanamide.

Metal or organic metal salt compounds which furnished the metal for the metal containing phthalocyanines include copper, cupric chloride, cuprous chloride and a copper pyridinium-chloride complex. Other copper yielding compounds which have been used to advantage are the chlorides, bromides, acetates and sulfates.

The temperature employed in the present process is not critical. However, best results are obtained in the temperature range of from about 180° C. to 300° C. preferably in a range of from about 200° C. to 250° C., and more preferably at a temperature from about 220° C. to about 230° C. The reaction, however, proceeds at temperatures lower than 180° C. and may be carried out at temperatures slightly above 300° C. but, in either case, the quality and yield of product becomes increasingly poor as the temperature deviates from the preferred range of 200 to 250° C.

In the reaction of phthalic anhydride with urea, the phthalic anhydride to urea mol ratio should be in the range of from about 1:2 to 1:5, preferably in a ratio of about 1:4 and more preferably in a ratio of about 1:3. In the preparation of copper phthalocyanine from phthalic anhydride, urea, copper sulfate and a molybdenum catalyst in accordance with this invention, the cycle time required will range from about 1.5 to 2.5 hours. At a temperature in the range of from 200° to 250° C. the reaction time may range from 5 to 90 minutes, and preferably from 5 to 45 minutes, and more preferably from 5 to 20 minutes.

The apparatus, which is an essential part for making metal containing phthalocyanines according to this invention, may be a heated ball mill, heated rod mill, jacketed flushing or sigma arm mixers or any rotary type reactor which is vented to the outside and permits intimate grinding and mixing of all ingredients during all stages of reaction, starting with the dry mass and passing through a semi-fused mass of a sticky plastic stage until finally the reaction mixture becomes a dry powder. The reaction may be carried out in any of the conventional mixing or kneading machines such as commonly used in the plastic arts. Preferably, the mixing machine should be provided with a heating means in order to raise the temperatures of the reactants to the desired reaction temperature. The apparatus should also be provided with a cooling means, such as cooling coils, in order to remove the heat generated during the reaction and after the reaction is completed. Machines of these types are widely used in the manufacture of rubber, plastics, etc. and therefore need not be further described for the purposes of the present invention.

In one method of making copper phthalocyanine, a mixture of approximately 4 mols of phthalic anhydride, 12 mols of urea and 1.1 mols of copper sulfate and a molybdenum catalyst were charged to a rod mill and heated to reaction temperature. The reaction temperature was maintained for an additional 30 minutes, resulting in a substantial high yield of quality copper phthalocyanine. The copper phthalocyanine was recovered as a fine powder from the reactor, which eliminated the need for additional crushing or grinding. The invention will be described in greater detail in conjunction with the following specific examples which are merely illustrative and not in any way intended to limit the scope of the present invention to the details herein set forth.

*Example I*

A vented trunnion rod mill reactor, containing hexagonal steel rods, was charged with the following reactants:

| | Grams |
|---|---|
| Phthalic anhydride | 148 |
| Urea | 180.2 |
| Copper sulfate | 44.1 |
| Molybdenum catalyst | 1.0 |

The reactants were rapidly heated to a temperature of 226° C. and maintained at this temperature for 45 minutes with continuous rotation of the reactor at approximately 60 r.p.m. At the end of the 45 minute reaction period, the reaction mass was cooled and discharged from the reactor as a fine powdery mass. Analysis of the powdery material recovered from the reactor showed an 83% yield of copper phthalocyanine based on phthalic anhydride charged with a total cycle time of about 90 minutes.

*Example II*

A jacketed, vented trunnion mill reactor, containing hexagonal steel rods was charged with the following reactants:

| | Grams |
|---|---|
| Phthalic anhydride | 72.3 |
| Urea | 88.0 |
| Copper sulfate | 20.0 |
| Molybdenum catalyst | 1.0 |

The reactants were rapidly heated to a temperature of from 204 to 216° C. and then maintained at this temperature for a period of approximately 45 minutes with continuous rotation of the reactor at approximately 27 r.p.m. At the end of the reaction period the reaction mass was cooled and discharged from the reactor as a dry powdery mass. Analysis of the powdery mass showed a yield of crude copper phthalocyanine in excess of 80%, based on the phthalic anhydride charged. The total cycle time for this reaction was approximately 180 minutes.

*Example III*

A vented trunnion rod mill reactor, containing hexagonal steel rods, was charged with the following reactants:

| | Grams |
|---|---|
| Phthalic anhydride | 148 |
| Urea | 180.2 |
| Copper sulfate | 44.1 |
| Molybdenum catalyst | 1.0 |

The temperature of the reaction mass was rapidly heated to about 226° C. and maintained at this temperature for approximately 5 minutes with continuous rotation of the reactor at about 60 r.p.m. Analysis of the samples taken from the reactor after 5 minutes reaction time resulted in a crude copper phthalocyanine in a high yield with high purity.

Surprisingly, it has been found that when the reaction is carried out in accordance with this invention, the reaction time may vary from 5 to 45 minutes, preferably from 5 to 20 minutes. The reaction is substantially complete in less than 45 minutes. This is quite surprising, in view of the reaction times which formerly varied from 4 to 10 hours. These long reaction times were believed to be necessary for optimum yield of reaction product in the prior art processes. Furthermore, when the reaction is carried out according to this invention, the advantages of both the solvent and bake process are obtained without the disadvantages of either. Furthermore, it was found that when the reaction was carried out in rotating vessels containing rods or balls, the reaction product obtained therefrom was of a higher purity, the reaction was easier to control and the product did not solidify. Other advantages of this process not found in the prior art processes was the uniformity of reaction throughout the reaction cycle, better heat transfer throughout the reaction mass, a lower power input and no restriction on the batch charge. The crude phthalocyanine recovered from the reactor was substantially free of by-product gases and was in a finely divided powdery state, which did not require further particle size reduction before conditioning to an acceptable pigment. This process, having all the advantages of the solvent and bake processes provides an economical and practical process for manufacturing phthalocyanine pigments.

What is claimed is:

1. In a process for the manufacture of phthalocyanine pigments by fusion synthesis of phthalic anhydride or a derivative thereof, urea or a derivative thereof, a metal yielding reagent and a molybenum catalyst, the improvement which comprises separately adding each of the reactants to a vented rotating mill type reactor which intimately mixes and grinds all reactants during all stages of reaction, heating the reactants to a temperature at which reaction will occur and maintaining this temperature with continuous rotation of the reactor until reaction occurs and thereafter recovering a phthalocyanine pigment in a finely divided powdery state.

2. The process of claim 1 wherein the reactants are heated to a temperature of from 180° to 300° C.

3. The process according to claim 2 wherein said temperature is maintained for from 5 to 90 minutes.

4. The process according to claim 1 wherein the reactants are heated to a temperature of 226° C. and this temperature is maintained for from 5 to 90 minutes.

5. In a process for the manufacture of phthalocyanine pigments by fusion synthesis of phthalocyanine forming reactants, the improvement which comprises separately adding phthalic anhydride, urea, a copper yielding reagent and a molybdenum catalyst to a vented rotating mill type reactor which intimately mixes and grinds all reactants during all stages of reaction, heating the reactants to a temperature of from 180° to 300° C. and maintaining this temperature with continuous rotation of the reactor until reaction occurs and thereafter recovering a copper phthalocyanine pigment therefrom in a finely divided powdery state.

6. In a process for the manufacture of phthalocyanine pigments by fusion synthesis of phthalocyanine forming reactants, the improvement which comprises separately adding 1 mol of phthalic anhydride, 3 mols urea, 0.3 mol of a copper salt and a molybdenum catalyst to a vented rotating mill type reactor which intimately mixes and grinds all reactants during all stages of reaction, heating the reactants to a temperature of from 180° to 300° C. and maintaining this temperature with continuous rotation of the reactor until reaction occurs and thereafter recovering a copper phthalocyanine pigment therefrom in a finely divided powdery state.

7. In a process for the manufacture of phthalocyanine pigments by fusion synthesis of phthalocyanine forming reactants, the improvement which comprises separately adding one mol of phthalic anhydride, 3 mols urea, 0.3 mol of a copper salt and a molybdenum catalyst to a vented rotating mill type reactor which intimately mixes and grinds all reactants during all stages of reaction, heating the reactants to a temperature of about 226° C. and maintaining this temperature with continuous rotation of the reactor for at least 5 minutes and thereafter recovering a copper phthalocyanine pigment therefrom in a finely divided powdery state.

References Cited by the Examiner
UNITED STATES PATENTS

| | | | |
|---|---|---|---|
| 2,964,532 | 12/1960 | Klenke | 260—314.5 |
| 3,188,318 | 6/1965 | Mack | 260—314.5 |

WALTER A. MODANCE, *Primary Examiner.*

J. A. PATTEN, *Assistant Examiner.*